Patented Nov. 8, 1938

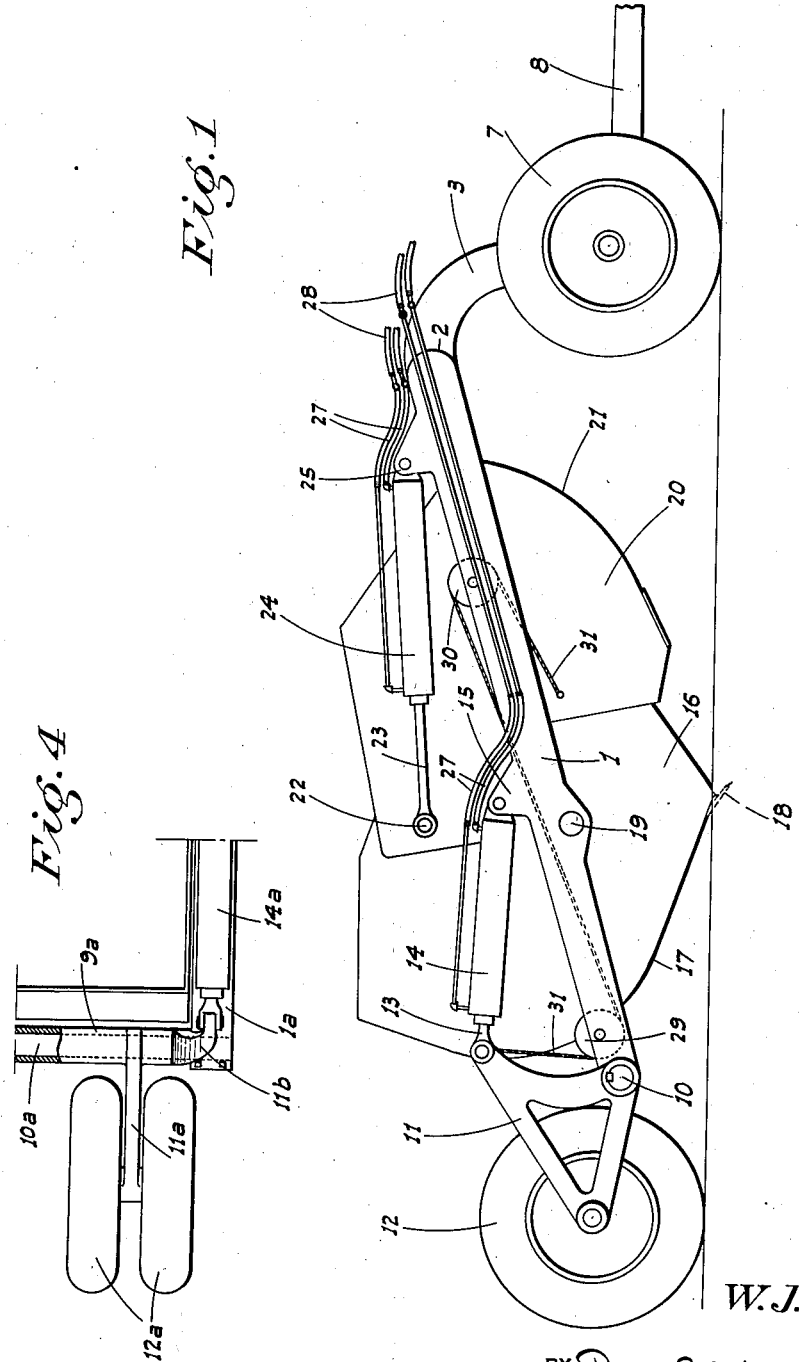

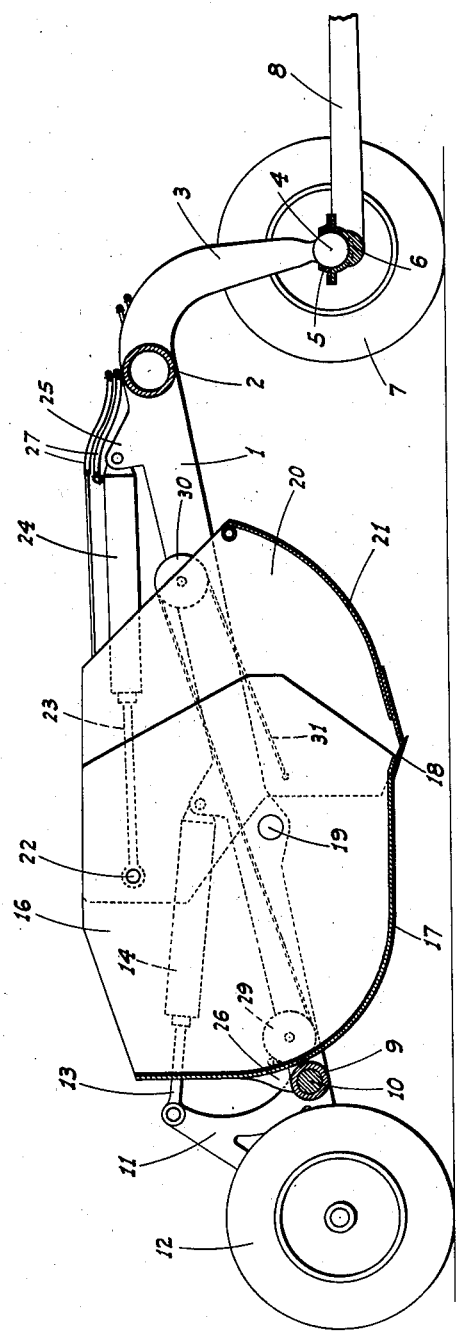

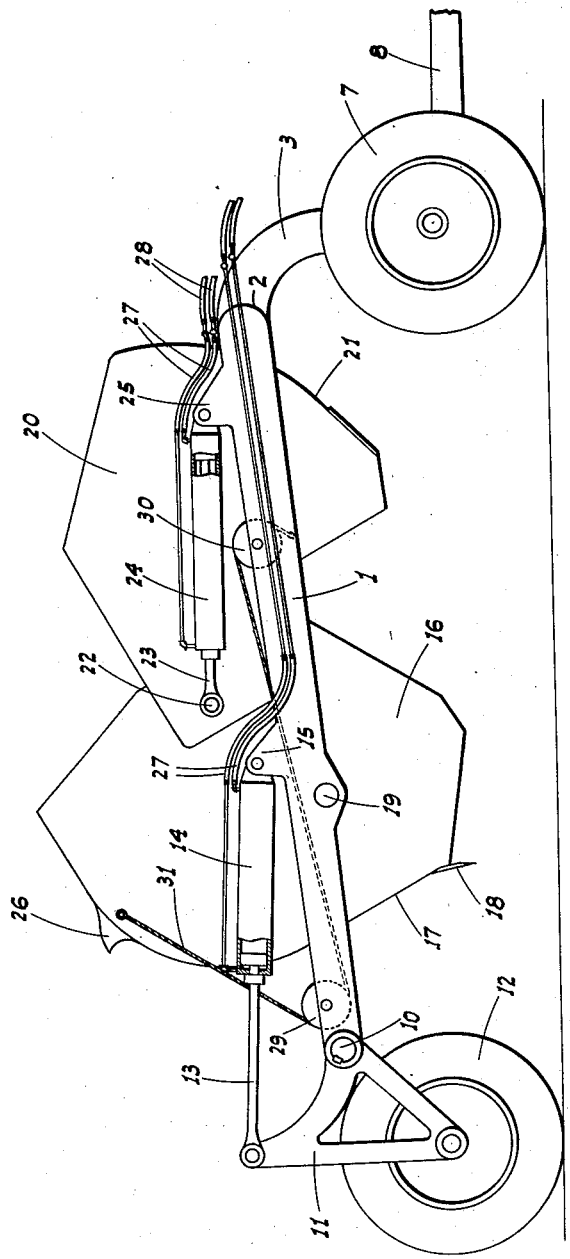

2,136,203

UNITED STATES PATENT OFFICE 2,136,203

WAGON SCRAPER

William Joseph Adams, Santa Cruz, Calif., assignor to W. J. Adams, Inc., Stockton, Calif., a corporation Application December 28, 1936, Serial No. 117,792

8 Claims. (Cl. 37—126)

This invention relates to carrier or wagon scrapers and particularly to one of large capacity supported on wheels, and adapted to be dumped by the upper forward tilting of the main scraper bowl. The principal objects of my invention are to provide a scraper of the above general type which has certain original features as follows:

1. A digging and scooping rear scraper bowl combined with front dirt carrying apron or bowl, together forming the complete bowl unit of the scraper; in which the front carrying apron is automatically actuated throughout its entire operating cycle by the operation of the same means and mechanism which actuates and controls the operation of the rear digging bowl.

2. A wagon scraper in which the complete operation of digging, scooping, loading and bringing of the bowl out of the dirt cut into the carrying position, is controlled by a single simplified operating mechanism, which also controls the positioning of the bowl cutting edge or blade for grading purposes. This arrangement is valuable for the following reasons. In the first place it allows for the use of a simplified mechanism to lift, operate and control the scraper through its entire operating cycle. It also allows for the complete capacity and power of these operating mechanisms to be concentrated into one operation at one time, instead of this capacity and power having to be divided between the bowl controlling mechanism and the lifting mechanism as is necessary in other scrapers of this type. It further allows for the use of a relatively small power unit to handle the scraper, which in turn means that less tractor power is required to actuate such power unit. This feature is of outstanding value because a large power unit requires and uses up too much of the tractor power just at the time this power is needed to pull the scraper into the dirt. It also allows for the complete operation of digging, scooping, loading and the bringing of the bowl out of the dirt into the carrying position, to be controlled by the tractor operator by means of one lever. This permits the said operator to do a better job of handling and controlling the power unit.

3. A tractor wagon scraper having the combined uses of a carrying scraper which scoops up its own dirt load, and a dirt hauling dump wagon which can be loaded by a power shovel, drag lire or the like. The structure is primarily designed as a dirt scooping and carrying scraper, but because of the fact that the bowl is entirely open to the top, with no inside obstructions, and because of the extremely low over all height of the entire structure with no projecting parts above the bowl, it may be easily loaded as above stated by power shovels and the like. A great advantage of this scraper for dirt hauling purposes over other types of tractor dump wagons is that it may also be used as an accurate grading and dirt spreading machine.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of the scraper in a scraping position.

Figure 2 is a sectional elevation of the same in a carrying position.

Figure 3 is a side elevation of the scraper in a dumping position.

Figure 4 is a fragmentary plan showing a modified form of wheel supporting structure.

Referring now more particularly to the characters of reference on the drawings, the scraper comprises parallel side frame beams 1 disposed with an upward slope to the front. At their forward end these beams are rigidly connected by a tubular cross member 2. A central goose-neck post 3 depends from the member 2 and carries a ball head 4 on its lower end which engages a socket 5 formed in the rigid supporting axle 6 of the front wheel truck 7. A tongue 8 rigid with the axle extends forwardly for a connection to the draw bar of a tractor.

At their rear end the beams 1 are rigidly connected by a cross sleeve 9. Turnable in this sleeve is a shaft 10 which is rigidly secured at its ends on bellcrank members 11, which are disposed so that their legs extend rearwardly and upwardly from the shaft. Wheels 12 (preferably of the dual pneumatic tire type) are turnably supported from the rear lower legs of the bellcranks and are disposed inwardly of the same so that the wheels ride in transverse planes inwardly of the side beams 1. The upper legs of the bellcranks are connected to piston rods 13 projecting from hydraulic cylinders 14 which are pivoted at their forward ends on brackets 15 upstanding from the beams 1.

These parts are arranged so that when the upper end of the upstanding bellcrank legs are slightly ahead of the shaft 10, and the wheel supporting legs are disposed at a forward downward slant, the piston rods 13 are fully retracted in the cylinders. The adjacent end of the frame is then at its lowest point relative to the ground and to the axis of the wheels. When the piston rods are extended from the cylinders, the bellcranks of course are turned about the supporting sleeve 9 as an axis, reversing the slope of the wheel supporting legs of the bellcrank. Since the point of connection of the bellcrank with the wheels is of course incapable of downward movement, the axis of the wheels forms a fulcrum about which the bellcranks rock, causing the sleeve 9 and consequently the adjacent end of the frame beams 1 to be raised. The front end of the frame is of course free to swivel about the ball 4 as an axis, without placing any lifting strains on the tongue 8 or the tractor to which said tongue is attached. The shaft 10 rigidly connecting the two bellcranks acts as a torsion member tying the bellcranks together so that the oppositely disposed hydraulic lifting devices must function together and thus avoiding any unevenness in operation or any tendency for the frame to be lifted more on one side than on the other.

The same result may be obtained by reversing the connecting arrangement as shown in Fig. 4. In this case the shaft 10a extends between and is connected to the frames 1a, while the sleeve 9a terminates inside the frames. The lower arms 11a of the bellcranks extend between the wheels 12a of each dual wheel unit and are secured on the sleeve. The upper arms 11b of the bellcranks are also of course secured on the sleeve 9a and deflect outwardly to aline with the cylinders 14a for connection to the piston rods thereof.

The main digging bowl of the scraper disposed between the rear portions of the side beams 1 comprises side plates 16 extending some distance above said beams and a combination bottom and back plate 17 having a scraper blade 18 extending across its front end and disposed as usual with a downward slant. Trunnions 19 are secured on the side plates some distance from the bottom thereof and toward the front end are turnably mounted on the beams 1. Provided to cooperate with the rear bowl is a front dirt carrying apron or auxiliary bowl comprising side plates 20 disposed in overlapping relation to the side plates of the bowl and a bottom plate 21 curving upwardly from its rear end. The rear end of said bottom plate 21 is adapted to overlap and rest on the plate 18 when the apron is in a closed position relative to the bowl. The rear portion of the side plates of the apron then overlap the forward portion of the side plates of the rear bowl from top to bottom and to a greater extent toward the top; said apron side plates 20 being cut diagonally intermediate their ends so that their upper portions extend rearwardly of the trunnions 19 while avoiding interference therewith as shown in Fig. 2. The side plates 20 not only act as complete closures for the dirt when the bowls are in transporting position, but also form substantial enclosures for the dirt as the latter is being dug as in Fig. 1. It is also to be noted that the trunnions 19 are positioned substantially central relative to the combined weight of the bowl and apron unit, so that said unit is substantially balanced in the frame. When the apron is in this closed position the upper edges of the side plates 16 and 20 of the bowl and apron respectively are substantially horizontal and on a common level some distance above the highest point of the frame structure as shown in Fig. 2.

Adjacent their upper ends the overlapping plates 16 and 20 are connected together by trunnions 22 the outer ends of which are engaged by the rear ends of piston rods 23. These project from the rear end of hydraulic cylinders 24 which are pivoted at their forward end on brackets 25 upstanding from the beams 1 adjacent their forward end. These parts are arranged so that when the apron and bowl are in a fully closed position relative to each other, the bottom plate 10 of the bowl is substantially horizontal and the piston rods 23 are fully extended as shown in Fig. 2. The back plate 17 of the bowl on the outside is provided with rearward projecting stop lugs 26 which overhang and engage the sleeve 9 when said bowl and apron are in their closed position, so as to prevent backward tilting of the back bowl beyond such position.

It may here be noted that the circulation of fluid into and out of the various hydraulic cylinders is controlled from the tractor; the cylinders having the necessary pipe lines connected to both ends and which include flexible portions 27 so as not to interfere with the necessary swiveling of the cylinders as the piston rods move in or out. It is also to be understood that the circulating pipe lines for the corresponding opposed cylinders are connected at the front end of the frame, so that a single pair of flexible pipes 28 may extend from the tractor for each pair of cylinders, with the assurance that the fluid will be evenly distributed to both cylinders.

The forward movement of the piston rods 23 a certain distance from their fully extended position causes the bowl to be swiveled forward about the trunnions 19 as an axis; disposed between plate 17 at a forward and downward angle and lowering the plate 18 as shown in Fig. 1. At the same time the apron is automatically opened up or moved clear of the plate by the following means:

Mounted on the inner face of each side beam 1 adjacent the rear end of the bowl and the front end of the apron are pulleys 29 and 30 respectively. A substantially taut cable 31 extends from an anchor at an adjustable point on the adjacent side plate of the bowl at the back and above the pulley 29, under and about said pulley to and over the pulley 30 and then back under said pulley to an anchorage on the adjacent side plate of the apron near its rear end and intermediate the top and bottom thereof, or just below the diagonally cut portion. As the bowl is thus swiveled therefore by movement of the piston rods 23, and the rear end of the bowl is swung upwardly, the adjacent anchored end of the cable is moved upwardly also and away from pulley 29. Since the cable is initially taut the run of the cable between the fixed pulley 30 and the adjacent anchored end is shortened. The apron is thus pulled forwardly and away from the forward end of the bowl, swung of course about the trunnion 22 as an axis. The greater the turning of the bowl and the greater the upward movement of the rear end of the same away from the adjacent pulley 29, the greater will be the extent of shortening of the forward lower run of the cable and the more will the apron be swung forwardly and ultimately upwardly as shown in Fig. 3. A reverse movement of the bowl of course reverses the relative setting of the cable and the apron drops of its own weight to the extent permitted by the cable. If, however, any obstructing material adjacent the blade should prevent the full closing of the apron, the cable merely becomes slack and no strain or damage is done to the cable or to the apron by this inability of the latter to close.

It will of course be understood that when the bowl and apron are in an engaged position as shown in Fig. 2 the cable is not under any tension, so as to allow the apron to close tightly against the bowl when the stop 26 is engaged with member 9, and also to allow the operator some leeway in handling the bowl.

In operation, to position the scraper for digging, the scraper is first lowered as a whole by means of the cylinders 14 until the cutting edge of the main or rear bowl is adjacent the ground. When the operator is ready to make a cut, the bowl is tilted down the desired extent by means of the cylinders 24. At the same time, due to the operative connections of the rear bowl with the front bowl or apron, the latter opens up to the position shown in Fig. 1. If the cut is too deep the operator relieves it by tilting the main bowl in the opposite direction by the cylinders 24. This may be done quickly because the cylinder is small and this is made possible by the fact that the entire bowl unit is practically balanced in the frame as previously stated, and the bowl and apron also are substantially balanced relative to each other. Low pressure in the cylinders and very little tractor power is thus needed in manipulating the bowl, leaving the majority of the tractor power available to pull the scraper when making a deep cut.

After the bowl is loaded it is tilted out of the ground, which causes the apron to form a complete dirt retaining enclosure with the bowl. Power is then applied to the cylinders 14 to raise the entire scraper with its load to the transporting position while the scraper is being hauled to the point of discharge. Then the scraper is further raised, as shown in Fig. 3, so that by the time the point of discharge is reached the bowl is at such a level that it may be quickly tilted to discharge the load; this being also done of course by means of the cylinders 24. The entire manipulation of the bowl itself, from the digging through the transporting to the dumping position is therefore controlled by the cylinders 24 alone. This means faster and simpler loading, since the operator has only to control a single lever or valve for one pair of cylinders at a time, during the entire loading operation.

The ease of tilting the bowl out of the cut when loading is aided by the fact that when the bowl is in its digging position and before it is loaded, the forward movement of the scraper tends to assist the cylinders 24 in tilting the bowl to such digging position, and in raising the apron clear of the bowl. A reverse action is had when the bowl is loaded and is being tilted out of the cut. This is because the load of the dirt in the apron, tending to lower the same, acts through the cable connection with the main bowl to tilt the latter upwardly at its front end. Also at this time the weight in the back of the bowl, rearwardly of the trunnions, also exerts a downward pressure tending to tilt the bucket out of the dirt. With either direction of tilting of the bowl therefore the tilting operation is performed with a very small expenditure of power. If it is desired to discharge the dirt gradually as in a leveling or grading operation, the extent to which the blade 18 is raised clear of the ground may be determined either by the raising of the frame or by the extent to which the bowl is tilted, or both. It will also be noted that the point of connection of the cable 31 with the bowl is a greater distance from the pivot 19 of said bowl than the point of connection of the cable with the apron is from the apron pivot 22. This of course assures relatively great opening movement of the apron with a small movement of the bowl, this being especially valuable when the bowl is being tilted down to a digging position.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A scraper comprising a wheel supported frame having spaced side beams, a rear digging bowl disposed between the beams, said bowl having side plates, trunnions pivoting the side plates intermediate the ends and the top and bottom thereof on the beams, a front auxiliary bowl having a bottom plate cooperating with and forming a closure for the front end of the rear bowl when the latter is in transporting position, said front bowl having side plates overlapping those of the rear bowl, and enclosing dirt disposed between the two bowls, pivot connections between the overlapping side plates above the trunnions, means applied to said pivot connections to pull the same forwardly whereby to tilt the rear bowl and means between the bowls to cause the front bowl to be tilted in the opposite direction to the rear bowl with the tilting of the latter.

2. A structure as in claim 1 in which said means comprises a pair of pulleys mounted on each side beam in longitudinally spaced relation, rearwardly and ahead of the trunnions respectively and a cable anchored at one end on the adjacent side plate of the rear bowl rearwardly of the trunnions and above the rearmost pulley, said cable extending thence down to and under said pulley to and over the foremost pulley, and rearwardly below said foremost pulley to an anchor on the adjacent side plate of the front bowl.

3. A scraper comprising a wheel supported frame having spaced side beams, a rear digging bowl disposed between the beams, means pivoting the bowl on the beams for tilting movement in one direction from a digging to a transporting position and then in the opposite direction to a dumping position, means to tilt the bowl, a front auxiliary bowl cooperating with and forming a closure for the front end of the rear bowl when the latter is in a transporting position, means including a direct connection between the bowls to cause the front bowl to be automatically tilted in the opposite direction to the rear bowl with the tilting of the latter and means to limit the tilting of the rear bowl in said one direction when it has reached a transporting position.

4. A scraper comprising a wheel supported frame having spaced side beams, a rear digging bowl disposed between the beams, means pivoting the bowl on the beams for forward tilting movement from a digging position to a transporting and then on up to a dumping position, means to tilt the bowl, a front auxiliary bowl cooperating with and forming a closure for the front end of the rear bowl when the latter is in a transporting position, pivot connection means between the bowls above the bowl pivoting means, a pair of pulleys mounted on each side beam, one pulley being rearwardly of and the other pulley being forwardly of the bowl pivoting means, and a cable anchored at one end on the adjacent side of the rear bowl above the rearmost pulley, said cable extending thence down to and under said pulley to and over the foremost pulley and then rearwardly below the same to an anchor on the front bowl.

5. A structure as in claim 4, in which the point of anchorage of the cable on the rear bowl is a greater distance from the bowl pivot than the point of anchorage of the cable on the front bowl is from the pivot connection means of the bowls.

6. A scraper comprising a wheel supported frame having spaced side beams, a rear digging bowl disposed between the beams, means pivoting the bowl intermediate its ends on the beams, for tilting movement, a front auxiliary bowl cooperating with and forming a closure for the front end of the rear bowl when the latter is in a transporting position, pivot connections between the bowls above said bowl pivoting means, means to swing the rear bowl about its pivot means, and means between the bowls to cause the front bowl to be tilted in the opposite direction to the rear bowl with the tilting of the latter.

7. A structure as in claim 6, in which the bowl tilting means is applied to the pivot connections of the bowls.

8. A structure as in claim 6, in which said last named means imparts a greater tilting movement to the front bowl than to the rear bowl.

WILLIAM JOSEPH ADAMS.